June 26, 1934.  J. P. SPANG  1,964,091
MEAT SLITTING MACHINE
Filed Feb. 1, 1932   6 Sheets-Sheet 6

Inventor.
Joseph P. Spang
by Heard Smith & Tennant.
Attys.

Patented June 26, 1934

1,964,091

UNITED STATES PATENT OFFICE 1,964,091

MEAT-SLITTING MACHINE

Joseph P. Spang, Quincy, Mass.

Application February 1, 1932, Serial No. 590,607

17 Claims. (Cl. 17—27)

This invention relates to machines which are designed for cutting two groups of crossing slits in meat or other articles of food. Such machines are commonly made with a turn-table for supporting the meat to be cut, a gang of knives by which the slits are cut in the meat, and a hold-down and stripper member which functions to hold the meat on the table during the slitting operation and also serves to strip the meat from the knives. The present invention relates particularly to the hold-down member and to means for raising said member from the meat at each end of the stroke of the knife in order to permit the turntable to be turned.

In my co-pending application Serial No. 507,203, filed January 7, 1931 I have illustrated a hold-down member which is arranged to have a rocking movement to lift it from the meat at the end of each slitting stroke and the hold-down member of the present application is also of this rocking type.

One object of the present invention is to provide an improved hold-down construction whereby at one end of the meat-slitting stroke the hold-down member is lifted from the meat sufficiently to permit the slit meat to be readily removed from the table and an unslit piece of meat to be placed thereon while at the other end of the meat slitting stroke the hold-down member is raised from the meat only sufficiently to permit the turntable to be turned.

Another object of the invention is to provide an improved means for operating the turntable and various other improvements in meat-slitting machines which will be more fully hereinafter set forth.

In order to give an understanding of the invention I have illustrated in the drawings a selected embodiment thereof which will now be described after which the novel features will be pointed out in the appended claims.

In the machine herein shown the meat to be slit, which is usually in the form of a slice, is indicated at 1, and this is supported on a turntable 2 which is mounted for turning movement in a suitable frame 3 by which the operative parts of the machine are supported. The turntable 2 is shown as having a shaft or stem 4 rigid therewith which extends through and finds bearing in the portion 5 of the frame 3. The frame 3 is also shown as provided with levelling screws 6 adapted to engage the under side of the turntable and thus retain the table in a level position.

The slitting of the meat is accomplished by a gang of knives and means are provided for giving the knives and the table 2 a relative movement by which the knives are caused to pass across the meat 1. In the illustrated embodiment of the invention this relative movement is secured by mounting the knives so that they move back and forth across the turntable 2.

While knives of any appropriate character may be used I will preferably use rotary knives 7, there being a plurality of such knives which are rigidly mounted upon a shaft 8 and which are held properly spaced from each other by collars 9 interposed between the knives. Knife-actuating means are provided for moving this gang of knives back and forth across the turntable 2 and simultaneously giving the knives a rotative movement. Such means comprises an inverted U-shaped member 10, the legs 11 of which straddle the frame 3 and are pivotally mounted on a shaft 12 supported in bearings 91 depending from the frame 3. The bridge portion 13 of this knife-actuating member 10 constitutes a handle by which said member is operated. Each leg 11 is provided with a slot 14 and the ends of the shaft 8 are extended through guiding slots 15 formed in the sides or cheek pieces 16 of the frame 3 and into the slots 14.

The shaft ends will preferably be provided with rolls 17 at the points where they extend into and through the slots 15 and 14. With this construction the swinging movement of the knife-actuating member 10 from the position shown in Fig. 2 to that shown in Fig. 3 and vice versa causes the gang of knives to be moved longitudinally of the frame and across the turntable 2, the slots 15 serving to give the knives a straight line movement. For causing rotation of the knives during the meat-slitting movement the shaft has fast thereon two gears 18 which mesh with racks 19 secured to the sides 16 of the frame 3. The gears 18 are held in mesh with the racks 19 by the fact that the shaft is travelling along the length of the slots 15. These gears 18 are smaller than the knives 7 and hence the knives will have a shearing or draw cut on the meat 1.

20 indicates a guard member which partially encircles the knives and gives protection to the operator. This guard member is formed with end portions 21 through which the shaft 8 extends and said guard member has arms 22 extending from each end thereof which are provided with rolls 23 that engage the top edge of the sides 16 of the frame. The engagement of the rolls 23 with the sides 16 serves to hold the guard member 20 in the operative position shown in which it encloses the upper edges of the knives.

Figure 2:
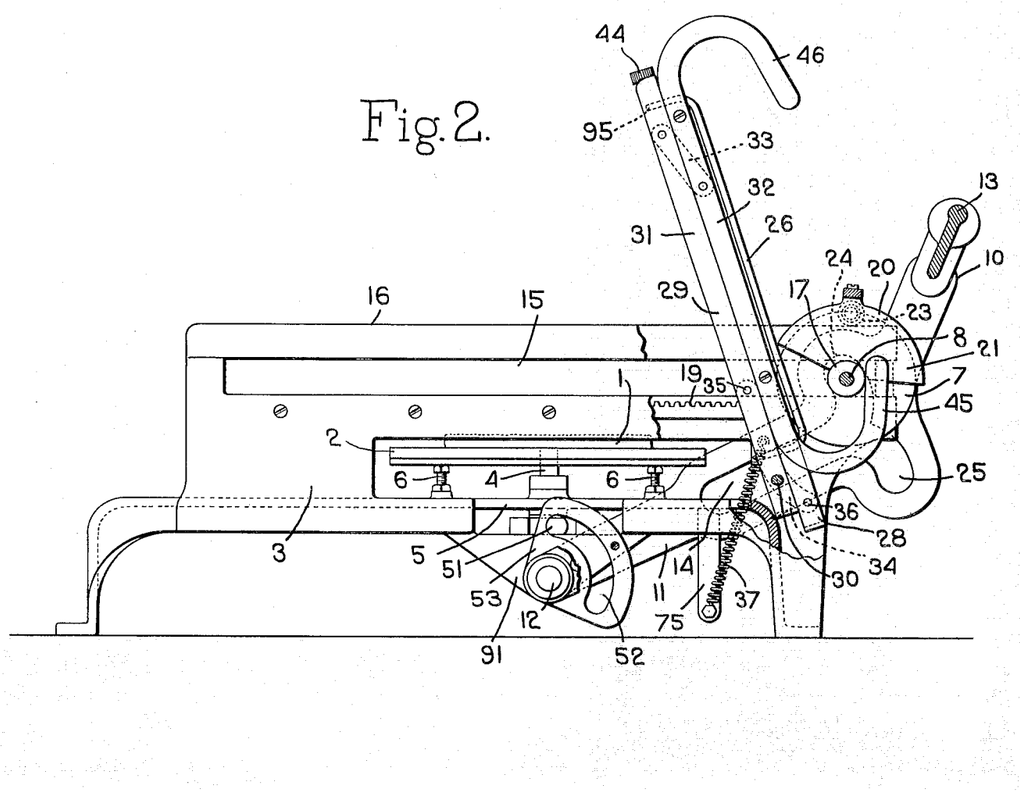
Fig. 2 is a side view illustrating the knives at the end of one meat-slitting stroke and with the hold-down member raised into a position to permit the meat to be removed from the turntable or a fresh slice of meat to be placed thereon.
Figures 3, 4:
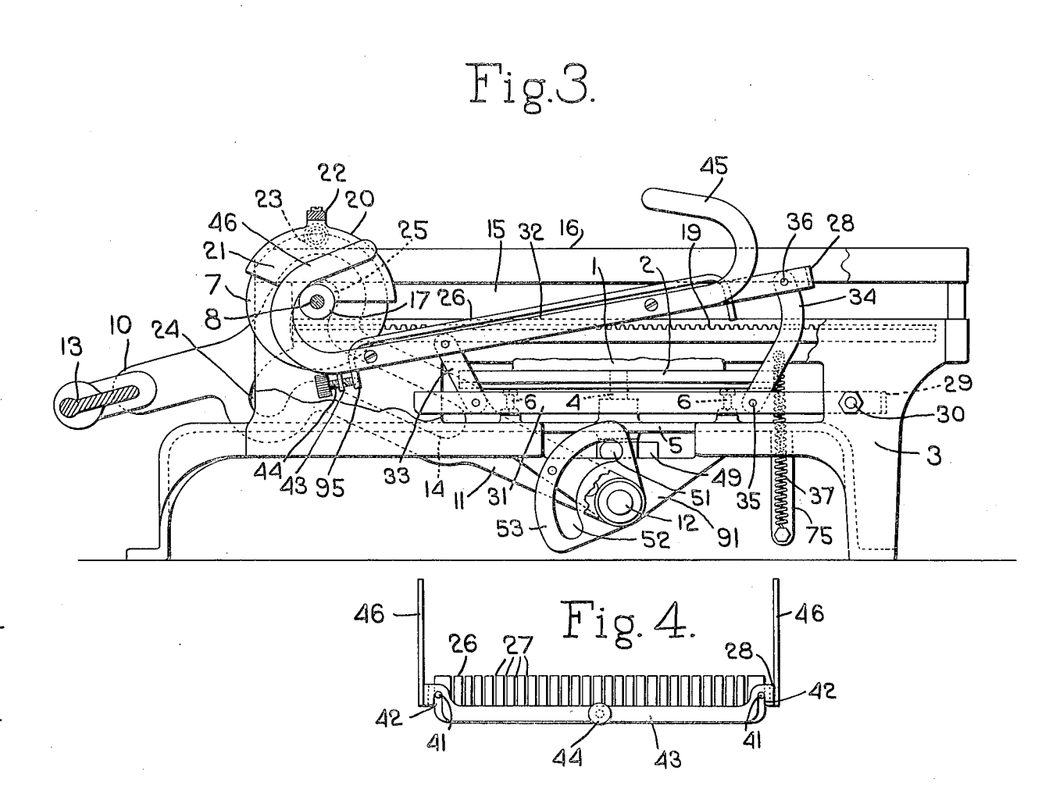
Fig. 3 is a view illustrating the position of the parts when the knives are at the opposite end of the meat-slitting stroke.
Fig. 4 is a detail view illustrating the manner of retaining the stripper in position.
Figure 5:
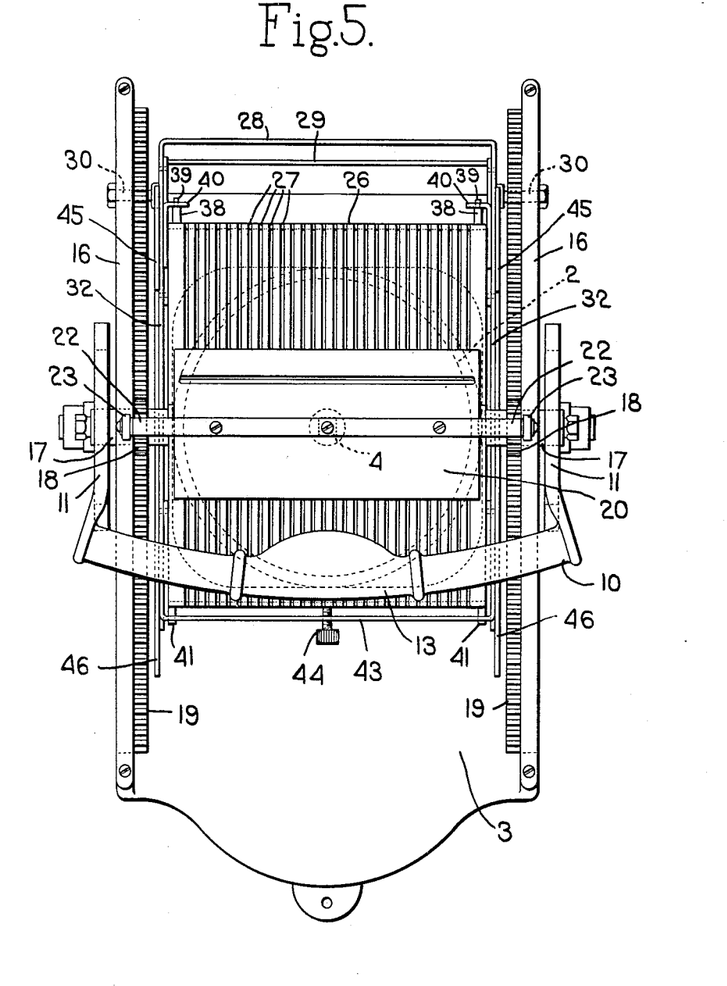
Fig. 5 is a top plan view of fig. 1.

The slot 14 in each arm 11 is forked or branched at its upper end as shown at 24, 25. During the final swinging movement of the knife-actuating member 10 to the right in Fig. 1 the roll 17 will move into the branch 24 of the slot as shown in Fig. 2 while during the final movement of the knife-actuating member to the left said roll will move into the other branch 25 as shown in Fig. 3.

A combined hold-down and stripper member is employed which is yieldingly held against the meat 1 during the meat-slitting operation but which is raised from the meat at the end of each stroke thereby to permit the turntable with the meat thereon to be turned, and the means for operating the combined hold-down and stripper is such that at the end of the meat-slitting stroke in one direction it will be raised from the meat sufficiently to permit the sliced meat to be removed from the turntable and a fresh unslitted slice to be placed on the turntable while at the end of the stroke in the opposite direction said hold-down and stripper member will be only raised from the meat sufficiently to permit the turntable to be readily turned.

This hold-down and stripper member comprises a grid element 26 which is provided with narrow slots 27 through which the knives operate. This grid element is shown as carried by a two-part support, the two sections of which are indicated at 28 and 29. The section 29 is in the form of a skeleton frame, the sides of which are pivotally mounted at 30 to the sides of the main frame 3. Said skeleton frame is open in the center and surrounds the turntable, the sides 31 of the frame being positioned just inside the side pieces 16 of the main frame 3. The section 28 also has a general skeleton shape and the sides 32 thereof are pivotally connected to the sides 31 of the section 29 by means of links 33 and 34.

The links 33, there being one such link on each side of the two-part supporting member, are relatively short, each link being pivoted at one end to the forward end of the lower section 29 and at its other end to the upper section 28 somewhat to the left of the center of said section. The links 34, of which there are also two, are somewhat larger than the links 33, each link being pivoted at its lower end as shown at 35 to one side 31 of the lower section 29 and at its upper end as shown at 36 to the side 32 of the upper section 28 near the right hand end thereof. The links 34 are acted upon by springs 37 which tend normally to close the upper section 28 down against the lower section 29 as indicated in Figs. 1 and 2, and also serve to hold the grid member 26 yieldingly against the meat.

The grid member 26 is removably secured to the upper section 28 and for this purpose the grid member 26 is formed at one end with extensions 38 having reduced ends 39 that are adapted to be entered into apertures formed in arms or projections 40 extending inwardly from the sides 32 of the upper section 28. At the other end, which is the left hand end in Fig. 3, the grid member 26 is provided with two pins 41 adapted to engage in notches 42 formed in the end or cross member 43 of the upper section 28 and said end member carries a clamping screw 44 which is adapted to engage in a recess formed in the down-turned end 95 of the grid member. This screw 44 co-operates with the extensions 38 to hold the grid member from longitudinal movement and the engagement of the reduced ends 39 of the extensions 38 in the apertures in the arms 40 together with the pins 41 and the clamping screw 44 serve to hold the grid member from vertical movement relative to the member 28. With this construction, however, the grid member can be easily removed whenever its removal is desirable for cleaning or other purposes.

The upper member 28 is formed at each end with a pair of curved arms, the arms at one end of said member being indicated at 45 and those at the other end at 46. These curved arms co-operate with the shaft 8 to raise the hold-down member from the meat at each end of the stroke.

Figure 1:
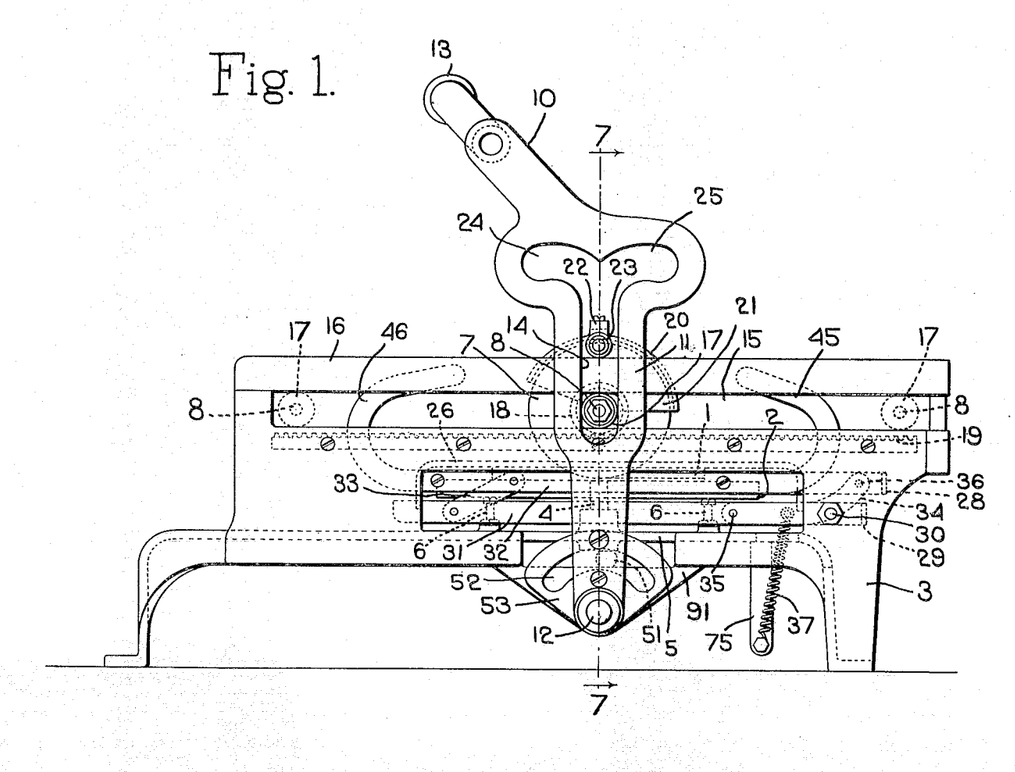
Fig. 1 is a side view of a meat-slitting machine embodying my invention with the knives in a mid-position.

During the meat-slitting stroke the hold-down member will be in the position shown in Fig. 1 with the grid 26 resting on the meat 1. The pivotal connection between the upper section 28 and the lower section 29 permits the upper section with the grid to be separated more or less from the lower section depending on the thickness of the meat 1 which is being slit. The tendency of the springs 37 is to swing the arms 34 downwardly and thereby to hold the grid yieldingly against the meat and as stated above the position of the grid will be determined by the thickness of the meat.

When the knife-actuating member 10 approaches the left hand end of its movement and after the knives 7 have been carried beyond the slice of meat 1 the shaft 8 will be brought into engagement with the left hand curved arm 46 and as the knife-actuating member 20 completes its swinging movement the engagement of the shaft with the arms 46 will swing or tilt the upper section 28 and the grid 27 upwardly on the links 33 and 34 into the position shown in Fig. 3, the lower section 29 remaining in its normal position. Such swinging or rising movement of the grid will lift it off from the meat 1 sufficiently so that the turntable 2 can be turned. Just after this grid has been thus raised from the meat the turntable is given a turning movement preferably through 90° by means which will be presently described. The movement of the knives from the right hand end position into the position shown in Fig. 3 causes a series of slits to be cut in the meat and when the grid has been raised from the meat at the end of the stroke and the turntable has been turned through 90° then the meat will be positioned so that upon the return stroke of the knives a second series of slits will be cut in the meat crossing the slits of the first series.

After the knife-actuating member 10 has been swung to the limit of its movement to the left and the turntable has been turned as above described by the means which will be presently described, then the knife-actuating member is swung toward the right to cut the second series of slits in the meat. During the initial movement of the knife-actuating member to the right the springs 37 will pull the upper section 28 and the grid downwardly to bring the grid yieldingly against the meat as shown in Fig. 1. As the knife-actuating member approaches the right hand end of its stroke and after the knives have cut the second series of slits and have passed beyond the grid the shaft 8 will engage the arms 45 and during the final movement of the knife-actuating member this engagement of the shaft with the arms 45 will tend to swing or tilt the hold-down member upwardly into the position shown in Fig. 2.

The pressure of the shaft against the upper section 28 is transmitted to the lower section 29 through the links 33, 34 and as a result the two sections 28, 29 will swing upwardly as a unit about pivots 30. The parts are so designed that the short swinging movement of the grid 26 about the pivot 30 is of greater amplitude than when it swings about the links 33, 34 as shown in Fig. 3 so that when the knife reaches the right hand end of its stroke the hold-down member not only is lifted from the meat but is raised a considerable distance above the meat so that the turntable is accessible to permit the slitted meat to be removed therefrom and a fresh unslitted slice placed thereon.

As stated above means are provided for turning the turntable at the end of each stroke of the slitting knives and in the construction herein shown the turntable is given its turning movement by the swinging movement of the knife-actuating member 10.

Figure 6:
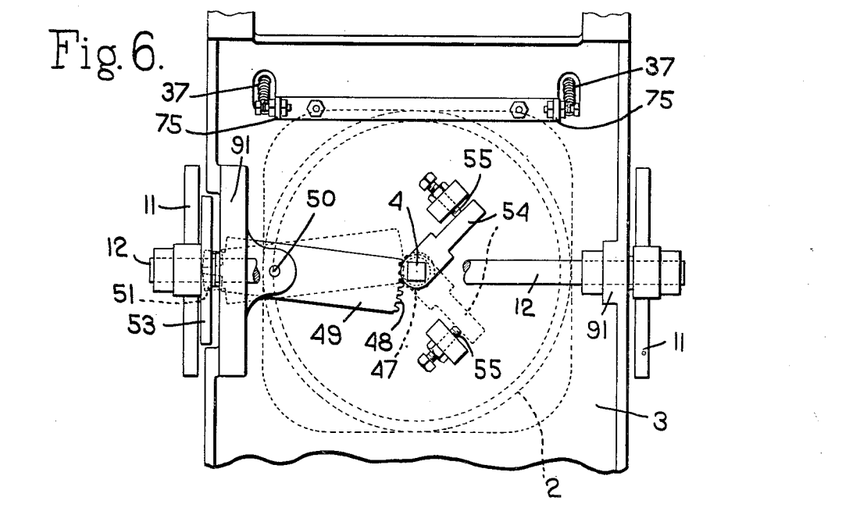
Fig. 6 is a fragmentary under-side view showing the means for turning the turntable.
Figure 7:
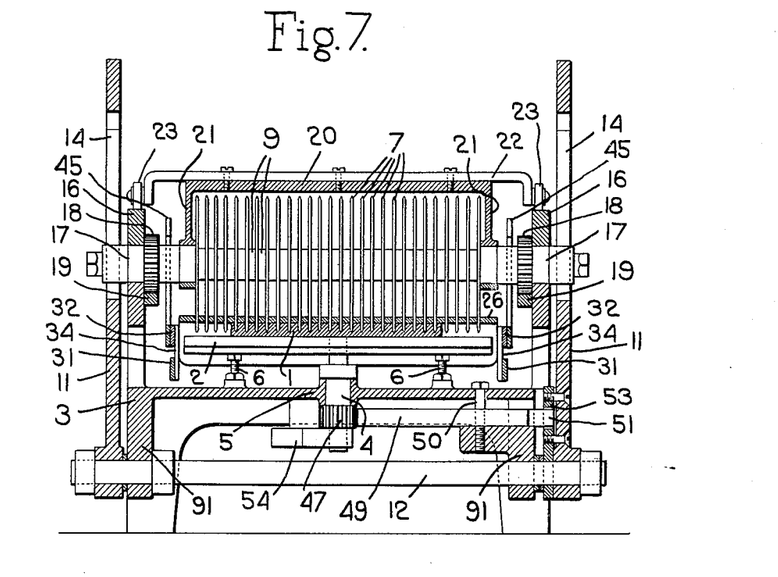
Fig. 7 is a section on the line 7—7, Fig. 1.

Referring to Figs. 6 and 7 it will be seen that the shaft 4 of the turntable has fast thereon a pinion 47 which meshes with gear teeth 48 formed on the end of an arm or lever 49 pivoted at 50 to the frame. This arm or lever extends beyond the pivot and the extremity 51 thereof occupies a slot 52 formed in a plate 53 which is rigid with one leg 11 of the knife-actuating member 10.

Just before the knife-actuating member 10 reaches the limit of its movement in either direction the end wall of the slot 52 will engage the end 51 of the lever arm 49 and will give said arm a slight turning movement sufficient to turn the turntable through approximately 90° as shown by the full and dotted line positions in Fig. 6. The shaft 4 is shown as having an arm 54 fast thereon which is adapted to engage either one of two adjustable stops 55 carried by the frame 3, which stops serve to limit the turning movement of the turntable. The turntable thus has an oscillatory movement, it being turned in one direction through approximately 90° at the end of the forward stroke of the knives and being turned in the opposite direction through approximately 90° at the end of the return stroke of the knives.

The operation of the device as thus far described will be readily apparent from the foregoing from which it will be understood that when the knife-actuating member is at the right hand end of its stroke as shown in Fig. 2 the hold-down and stripper will be separated from the table 1 so that a piece of meat can be placed thereon. The knife-actuating member is then given its forward stroke toward the left and during the initial swinging movement the hold-down member and stripper will be lowered onto the meat and will be yieldingly held against the meat by the springs 37 while the knives are cutting the slits therein. As the knife-carrying member reaches the end of the forward stroke the hold-down and stripper member is raised slightly from the meat as shown in Fig. 3 and at the same time the lever arm 49 is actuated to turn the turntable 2 with the meat thereon. The knife-actuating member 80 is then given its return stroke and during the initial portion of the return stroke the grid 26 will be moved down against the meat by the action of the spring 37 and will thus yieldingly hold the meat during the cutting of the second series of slits which it will be understood will be formed at right angles to the slits of the first series. As the knife-actuating member 10 completes its return movement the hold-down and stripper member will be raised into the inoperative position shown in Fig. 2 in which position the turntable is freely accessible to have the slit piece of meat removed therefrom and a fresh piece of meat placed thereon.

It will be noted that the hold-down member is thus raised from the meat a greater distance at the end of the return stroke than at the end of the forward stroke.

Figure 8:
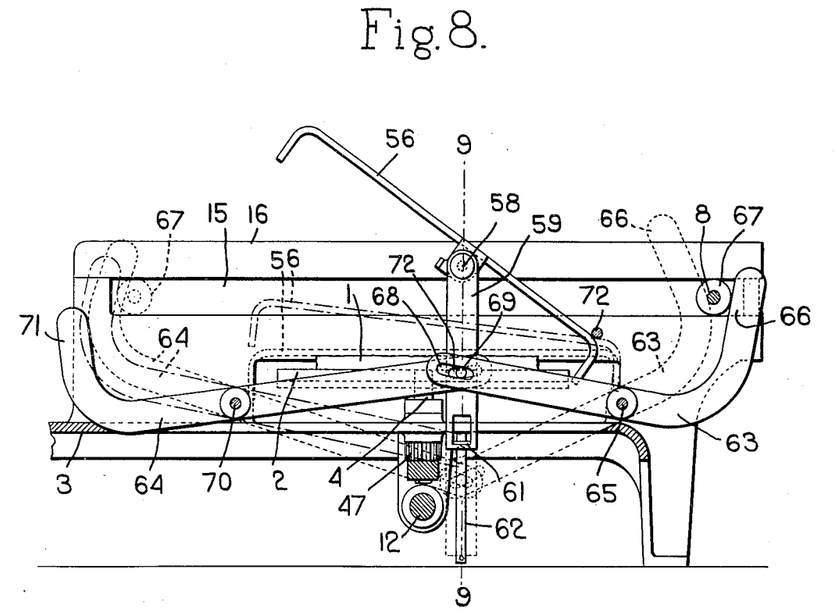
Fig. 8 is a fragmentary sectional view showing a different embodiment of the invention.
Figure 9:
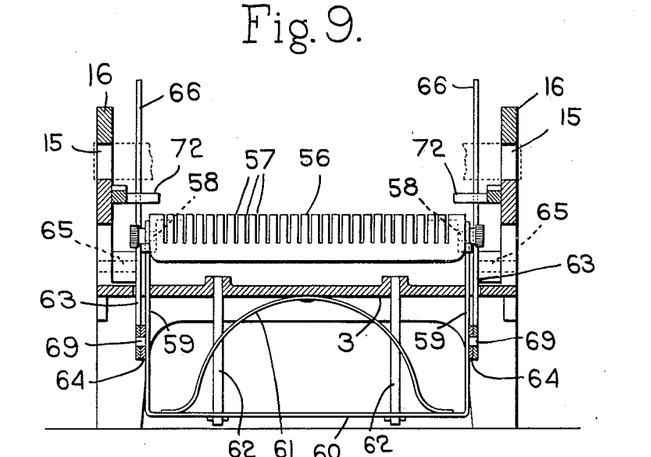
Fig. 9 is a fragmentary section on substantially the line 9—9, Fig. 8.

In Figs. 8 and 9 I have illustrated a slightly different embodiment of the invention. In this construction the grid member is shown at 56 and it is provided with the slots 57 to receive the knives. Said grid member is pivotally mounted at 58 on the arms 59 and a U-shaped element 60 and means are provided for moving said element 60 upwardly to lift the grid from off the meat 1. This U-shaped element 60 is acted upon by a spring 61 which normally tends to hold it in its lowered position shown in Fig. 9 but as stated above it is capable of being moved upwardly to lift the grid 56 from the meat and it is guided in its vertical movement by guiding pins 62.

Such movement is given to the member 60 through the medium of levers 63 and 64 which are actuated by the swinging movement of the knife-actuating member. There are two levers 63, one at each side of the machine, said levers being pivoted to the frame at 65. Each lever has an upturned end 66 adapted to be engaged by a roll 67 on the shaft 8 and the inner end of each lever is provided with a slot 68 in which is received a pin 69 extending from one of the legs 59 of the U-shaped member 60.

There are also two levers 64, one at each side of the machine, said lever being pivoted to the frame at 70 and each lever having the upturned end 71 and also being provided with a slot 72 at its inner end through which the pin 69 extends. While the knives are in a midway position or are actually slitting the meat the spring 61 will hold the U-shaped member 60 yieldingly in its lower position and thereby yieldingly hold the grid member 56 against the meat 1, during which time the levers 63, 64 will be in the dotted line position.

As the knife-actuating member approaches the end of its forward stroke, which will be as it approaches the left hand limit of its movement in Fig. 8, the rolls 67 will engage the upturned ends 71 of the arms 64 and thereby swing said arms from the dotted to the dot and dash line position. This will raise the U-shaped member 60 slightly and will thus lift the grid 56 from the meat as shown by the dot and dash line position.

At the completion of the forward stroke the turntable is given a turning movement as above described. When the knife-actuating member approaches the end of its return stroke or its extreme position to the right Fig. 8 the rolls 67 will engage the upturned ends 66 of the levers 63 and will thus swing said levers from the dotted- to the full-line position thereby raising the U-shaped member 60 into the full-line position. During this upward movement one end of the grid engages stop pins 72 whereby the grid is turned into the full-line position thus carrying it sufficiently away from the slice of meat 1 to permit the latter to be readily removed from the table and a fresh slice placed thereon.

In both embodiments of the invention the hold-down member is lifted from the meat a greater distance at one end of the stroke than at the other end of the stroke.

I claim.

1. In a machine for slitting meat, the combination with a table for supporting the meat to be slit, of a gang of knives, means to produce a relative forward and backward movement between the table and the knives, whereby the knives operate to slit the meat on the table, a hold-down member to engage the meat during the operation of the knives thereon, and means associated with the knives to separate the hold-down member from the meat at the end of each forward or backward relative movement, said means operating to separate the hold-down member a greater distance from the meat at the end of the relative movement in one direction than at the end of the relative movement in the other direction.

2. In a machine for slitting meat, the combination with a turntable to support the meat to be slit, of a gang of knives, means to produce a relative forward and backward movement between the table and the knives, whereby the knives operate to slit the meat on the table, a hold-down member to engage the meat during the operation of the knives thereon, means associated with the knives to separate the hold-down member from the meat at the end of each forward or backward relative movement, said means operating to separate the hold-down member a greater distance from the meat at the end of the relative movement in one direction than at the end of the relative movement in the other direction, and means to turn the turntable at the end of each backward or forward relative movement.

3. In a machine for slitting meat, the combination with a table for supporting the meat to be slit, of a gang of knives, means to produce a relative forward and backward movement between the table and the knives, whereby the knives operate to slit the meat on the table, a hold-down member to engage the meat during the operation of the knives thereon, means associated with the knives to raise the hold-down member from the meat at the end of both the backward and forward relative movement, such means operating to separate the hold-down member from the meat a greater distance at the end of the relative movement in one direction than at the end of the relative movement in the other direction.

4. In a machine for slitting meat, the combination with a turntable for supporting the meat to be slit, of a gang of knives, means to produce a relative backward and forward movement between the turntable and the knives thereby to cut slits in the meat, a hold-down member to engage the meat during the operation of the knives thereon, means associated with the knives to separate the hold-down from the meat at the end of each backward or forward movement, said means operating to separate the hold-down a greater distance from the meat at the end of the movement in one direction than at the end of the movement in the other direction, and means operated by such relative movement to turn the turntable.

5. In a machine for slitting meat, the combination with a table for supporting the meat to be cut, of a gang of knives, means to produce a relative backward and forward movement between the turntable and knives, a rocking hold-down member, means rendered operative at the end of each backward or forward movement to rock the hold-down member and thus separate it from the meat, such means operating to give the hold-down member a greater rocking movement at the end of the relative backward movement than at the end of the relative forward movement.

6. In a device of the class described, the combination with a turntable turnable about a fixed axis, of a gang of knives, knife-actuating means to move the knives bodily back and forth across the turntable, a hold-down member, and means operated by the knife-actuating member to raise the hold-down member from the meat at the end of each stroke of the knives, said means operating to separate the hold-down member a greater distance from the meat at the end of the stroke in one direction than at the end of the stroke in the opposite direction.

7. In a device of the class described, the combination with a meat-supporting table, of a gang of rotary knives movable bodily back and forth across the table, guiding means to guide the knives in their movement, knife-actuating means to give the knives their back and forth movement, means to rotate the knives during such movement, a hold-down member to engage the meat during the operation of the knives thereon, means rendered operative at the end of each stroke of the knives to lift the hold-down member free from the meat, said means operating to give the hold-down member a greater lift at the end of the stroke in one direction than at the end of the stroke in the opposite direction.

8. In a device of the class described, the combination with a turntable, of a gang of rotary knives movable bodily back and forth across the turntable, guiding means to guide the knives in their movement, knife-actuating means to give the knives their back and forth movement, means to rotate the knives during such movement, a hold-down member to engage the meat during the operation of the knives thereon, means rendered operative at the end of each stroke of the knives to lift the hold-down member free from the meat, said means operating to give the hold-down member a greater lift at the end of the stroke in one direction than at the end of the stroke in the opposite direction, and means operating in timed relation with the knife-actuating means to turn the turntable at the end of each stroke.

9. In a machine for slitting meat, the combination with a table for supporting the meat to be slit, of a gang of knives means to produce a relative forward and backward movement between the table and the knives whereby the knives operate to slit the meat on the table, a tilting hold-down member to engage the meat during the operation of the knives thereon, and means associated with the knives to tilt the hold-down member at the end of each forward or backward relative movement, thereby to raise said member from the meat, said means operating to give the hold-down member a greater tilting movement at the end of the relative movement in one direction than at the end of the relative movement in the other direction.

10. In a machine for slitting meat, the combination with a turntable for supporting the meat to be slit, of a gang of knives, means to produce a relative forward and backward movement between the turntable and the knives whereby the knives operate to slit the meat on the turntable, a tilting hold-down member to engage the meat during the operation of the knives thereon, means associated with the knives to tilt the hold-down member at the end of each forward or backward relative movement, thereby to raise said member from the meat, said means operating to give the hold-down member a greater tilting movement at the end of the relative movement in one direction than at the end of the relative movement in the other direction, and means operating in timed relation with the relative movement between the knives and the turntable to turn the turntable at the end of each backward or forward relative movement.

11. In a device of the class described, the combination with a turntable, of a gang of knives, knife-actuating means to move the knives back and forth across the turntable, a tilting hold-down member, and means operated by the knife-actuating member to tilt the hold-down member, thereby raising it from the meat at the end of each stroke of the knives, said means operating to tilt the hold-down member a greater distance from the meat at the end of the stroke in one direction than at the end of the stroke in the opposite direction.

12. In a device of the class described, the combination with a meat-supporting table, of a gang of knives, knife-actuating means to move the knives back and forth across the table, a hold-down member to engage the meat during the operation of the knives, a two-part supporting frame for the hold-down member, means operative as the knives complete their movement in one direction to tilt the entire supporting frame and hold-down member in one direction thereby to raise the hold-down member from the meat, and means operative as the knives complete their movement in the opposite direction to tilt the upper section only of the supporting frame and thereby raise the hold-down member from the meat.

13. In a device of the class described, the combination with a meat-supporting table, of a gang of knives, knife-actuating means to move the knives back and forth across the table, a hold-down member, a two-part supporting frame on which the hold-down member is mounted, means rendered operative as the knives complete their movement in one direction to raise the entire supporting frame and hold-down member thereby to clear the latter from the meat, and as the knives complete their movement in the opposite direction to raise the upper section only of the supporting frame and the hold-down member relative to the lower section, thereby separating the hold-down member from the meat.

14. In a device of the class described, the combination with a meat-supporting table, of a gang of knives, knife-actuating means to move the knives bodily back and forth across the table, a hold-down member, a vertically-moving frame supporting said hold-down member, means operative when the knives complete their movement in each direction to move the frame vertically, thereby raising the hold-down member from the meat.

15. In a device of the class described, the combination with a meat-supporting table, of a gang of knives, knife-actuating means to move the knives back and forth across the table, a hold-down member, a vertically-moving frame supporting said hold-down member, means operative when the knives complete their movement in each direction to move the frame vertically, thereby raising the hold-down member from the meat, said means operating to give the frame a greater rising movement when the knives complete their movement in one direction than when they complete their movement in the other direction.

16. In a device of the class described, the combination with a meat-supporting table, of a gang of knives, knife-actuating means to move the knives bodily back and forth across the table, a vertically-moving frame, a hold-down member tiltably supported by said vertically-moving frame, means operative when the knives complete their movement in each direction to move the frame vertically, and means to cause said hold-down member to tilt during the rising movement of the frame.

17. In a device of the class described, the combination with a meat-supporting table, of a gang of knives, knife-actuating means to move the knives back and forth across the table, a vertically-moving frame, a hold-down member pivotally mounted on the frame, means operative when the knives complete their movement in each direction to move the frame vertically, thereby raising the hold-down member from the meat, said means operating to give the frame a greater rising movement when the knives complete their movement in one direction than when they complete their movement in the other direction, and means to cause the hold-down member to turn about its pivot as the frame rises.

JOSEPH P. SPANG.